United States Patent
Kato et al.

(10) Patent No.: US 7,119,916 B2
(45) Date of Patent: Oct. 10, 2006

(54) PRINTING SYSTEM, IMAGE FORMING APPARATUS AND PRINT MANAGEMENT PROGRAM

(75) Inventors: Tomokazu Kato, Toyokawa (JP);
Yoichi Kawabuchi, Itami (JP)

(73) Assignee: Minolta Co., Ltd., Osaka (JP)

( * ) Notice: Subject to any disclaimer, the term of this patent is extended or adjusted under 35 U.S.C. 154(b) by 832 days.

(21) Appl. No.: 10/107,212

(22) Filed: Mar. 28, 2002

(65) Prior Publication Data

US 2002/0140970 A1  Oct. 3, 2002

(30) Foreign Application Priority Data

Mar. 28, 2001  (JP) .............................. 2001-092477

(51) Int. Cl.
*G06F 3/12* (2006.01)
*G06K 1/00* (2006.01)

(52) U.S. Cl. .......................... 358/1.15; 399/43; 399/79

(58) Field of Classification Search ............... 358/1.15; 399/43, 79, 8; 714/2
See application file for complete search history.

(56) References Cited

U.S. PATENT DOCUMENTS 5,784,664 A * 7/1998 Nakamura et al. .............. 399/8
5,812,747 A * 9/1998 Kayano et al. ............ 358/1.15

FOREIGN PATENT DOCUMENTS

| JP | 08-197812 | 8/1996 |
|----|-----------|--------|
| JP | 11-203082 | 7/1999 |

* cited by examiner

*Primary Examiner*—Kimberly Williams
*Assistant Examiner*—Dillon Murphy
(74) *Attorney, Agent, or Firm*—Buchanan Ingersoll & Rooney PC

(57) ABSTRACT

A printing system includes multiple image forming apparatuses connected over a network. The multiple image forming apparatuses are printers, copying machines or the like, and carry out printing based on print data. The printing system has a substitute printing function or a printing task distributing function. When print data is printed out using a first image forming apparatus and a second image forming apparatus via the printing substitution function or the printing task distributing function, the number of pages printed by the second image forming apparatus is counted and kept track of by the first image forming apparatus. Consequently, regardless of whether group management is in place at the second image forming apparatus, the number of pages printed may be centrally maintained by the first image forming apparatus.

12 Claims, 10 Drawing Sheets

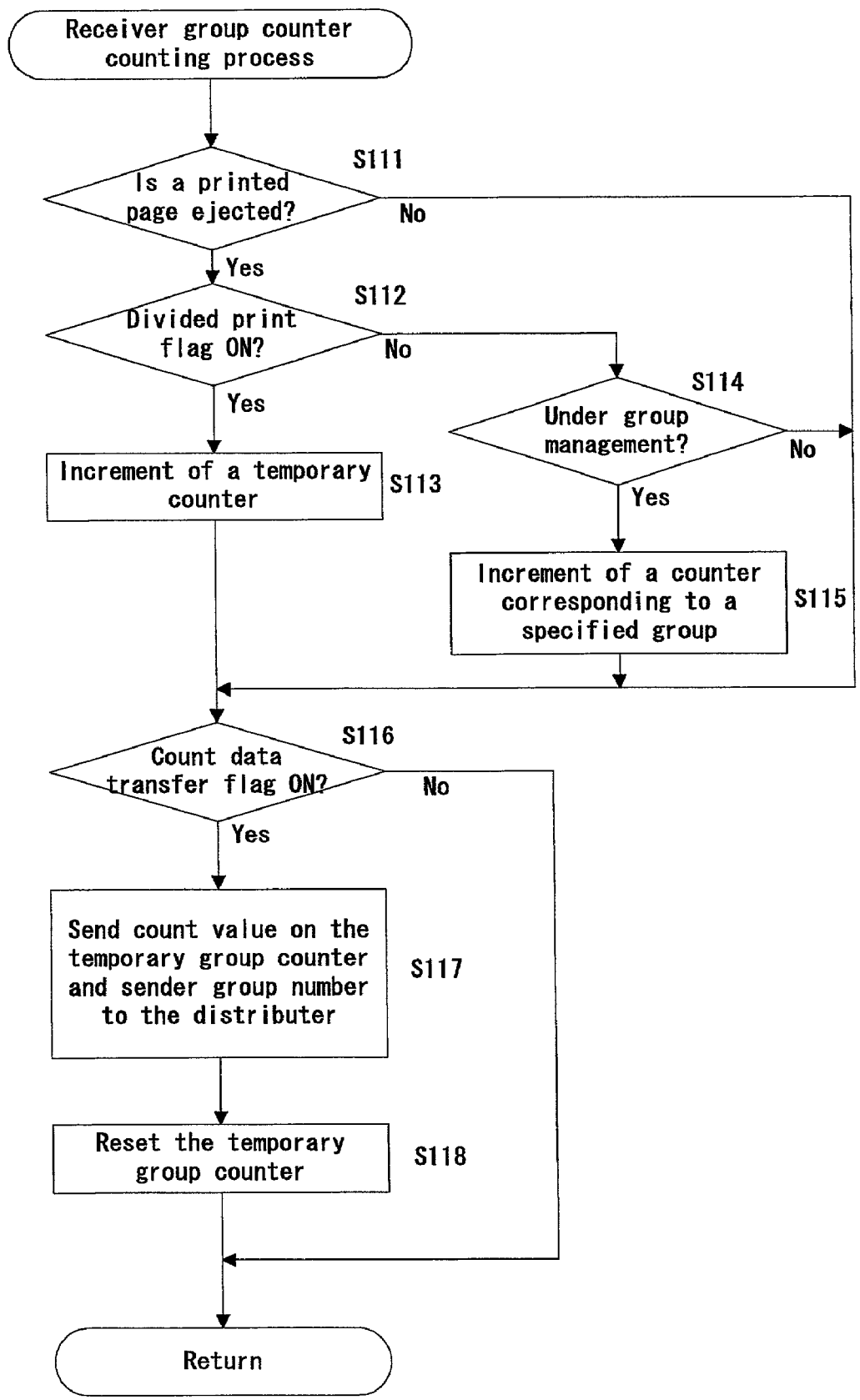

PRINTING SYSTEM, IMAGE FORMING APPARATUS AND PRINT MANAGEMENT PROGRAM

CROSS-REFERENCE TO RELATED APPLICATIONS

This application is based on application No. 2001-92477 filed in Japan, the contents of which is hereby incorporated by reference.

BACKGROUND OF THE INVENTION

1. Field of the Invention

This invention relates to the managing of printing tasks in multiple image forming apparatuses connected to a network.

2. Description of the Related Art

A printing system in which multiple image forming apparatuses are connected over a network is known. These multiple image forming apparatuses comprise printers, copying machines or the like. Such a printing system usually is used in an environment in which there is a relatively large number of users and therefore a large amount of printing (i.e., a large organization such as a company). In such a case, one image forming apparatus is often used by more than one organization, or multiple image forming apparatuses may be used in an environment in which multiple organizations coexist in the same LAN. Such a printing system often uses group management in order to keep track of the number of pages printed for each group or organization. In group management, the name of the group is registered in each image forming apparatus, and the number of pages printed for each group or further for each user is counted and recorded. In other words, printing is permitted only for users of registered groups, and the number of pages printed by any such user is recorded. The number of pages printed is counted per apparatus for each group, and the total number of pages printed for each group is recorded by the administrator.

In addition, such a printing system has a substitute printing function by which, when a failure occurred in the original printing apparatus, remaining print data is transferred to another image forming apparatus such that the remaining data may be printed out, as well as a printing task distributing function by which the print data is distributed to multiple image forming apparatuses for printing in order to reduce the printing time.

However, the following problems occur when these functions are used. For example, let us assume a situation in which Group A is registered with an image forming apparatus 1 and no groups are registered with other image forming apparatuses 2 and 3. An example of such a situation would be a situation in which new copying machines have been introduced but no groups have been registered. In this case, if a user of Group A requests via the image forming apparatus 1 that substitute printing be performed by the image forming apparatus 2 or 3 and printing is completed by either apparatus, the number of pages printed for Group A is not counted by the substitute apparatus, resulting in an inaccurate record of the number of pages printed for Group A.

OBJECT AND SUMMARY

An object of the present invention is to accurately record the number of pages printed in a printing system in which substitute printing wherein print data is transferred from one image forming apparatus to another for printing, or printing task distributing is performed, regardless whether group registration has been already carried out.

The printing system according to a first aspect of the present invention is a printing system comprising a first image forming apparatus and a second image forming apparatus connected to a network.

The first image forming apparatus includes a memory that stores print data; a first counter that counts the number of pages printed by the first image forming apparatus based on the print data; a processor that generates as partial print data part of the print data stored in the memory; a first transmission controller that sends the partial print data generated by the processor to the second image forming apparatus; and a reception controller that receives the counter value representing the number of pages printed by the second image forming apparatus based on the partial print data.

The second image forming apparatus includes a second counter that counts the number of pages printed based on the partial print data and a second transmission controller that sends the counter value representing the number of printed pages counted by the second counter to the first image forming apparatus.

The embodiment has the following characteristics:

The first counter updates the counter value representing the number of printed pages by adding the counter value received by the reception controller to the current counter value.

The first counter includes a counter corresponding to a registered group, the first transmission controller sends information regarding the registered group together with the partial print data, and the second transmission controller sends the group information together with the counter value.

The first image forming apparatus permits printing only for users that belong to a registered group.

The processor generates partial print data when a failure occurs while the first image forming apparatus is performing printing based on print data.

A third image forming apparatus is connected to the network.

The processor generates multiple sets of partial print data by dividing the print data stored in the memory into multiple sets, and the first transmission controller sends each set of partial print data to the second and third image forming apparatuses.

The image forming apparatus according to a second aspect of the present invention is an image forming apparatus connected to other image forming apparatuses over a network, wherein such apparatus includes a memory that stores print data; a printing unit that performs printing based on the print data; a counter that counts the number of pages printed by the printing unit based on the print data; a processor that generates as partial print data part of the print data stored in the memory; a transmission controller that sends the partial print data generated by the processor to one or more of the other image forming apparatuses; and a reception controller that receives the counter value or values representing the number of pages printed by one or more of the other image forming apparatuses based on the partial print data.

The embodiment has the following characteristics:

The counter updates the counter value representing the number of pages printed by adding the counter value or values received by the reception controller to the current counter value.

A registered group has a corresponding counter, the transmission controller sends information regarding the registered group together with the partial print data, and the reception controller receives the group information together with the counter value.

The processor generates partial print data when a failure occurs while the printing unit is performing printing based on print data.

The print management program according to a third aspect of the present invention is a print management program that records the number of pages printed using the image forming apparatus connected with other image forming apparatuses over a network, wherein such program includes a step of storing print data; a step of performing printing based on the print data; a step of counting the number of pages printed based on the print data; a step of generating as partial print data part of the print data stored in the memory; a step of sending the generated partial print data to the other image forming apparatus or apparatuses; and a step of receiving the counter value representing the number of pages printed by each other image forming apparatus based on the partial print data.

The embodiment includes a computer-readable recording medium in which the print management program is recorded.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 10 is a flow chart showing the details of the counting process performed in conjunction with the group counter of the receiving apparatus.

In the following description, like parts are designated by like reference numbers throughout the several drawings.

DESCRIPTION OF THE PREFERRED EMBODIMENTS

An embodiment of the present invention is described below with reference to the accompanying drawings.

Figure 1:
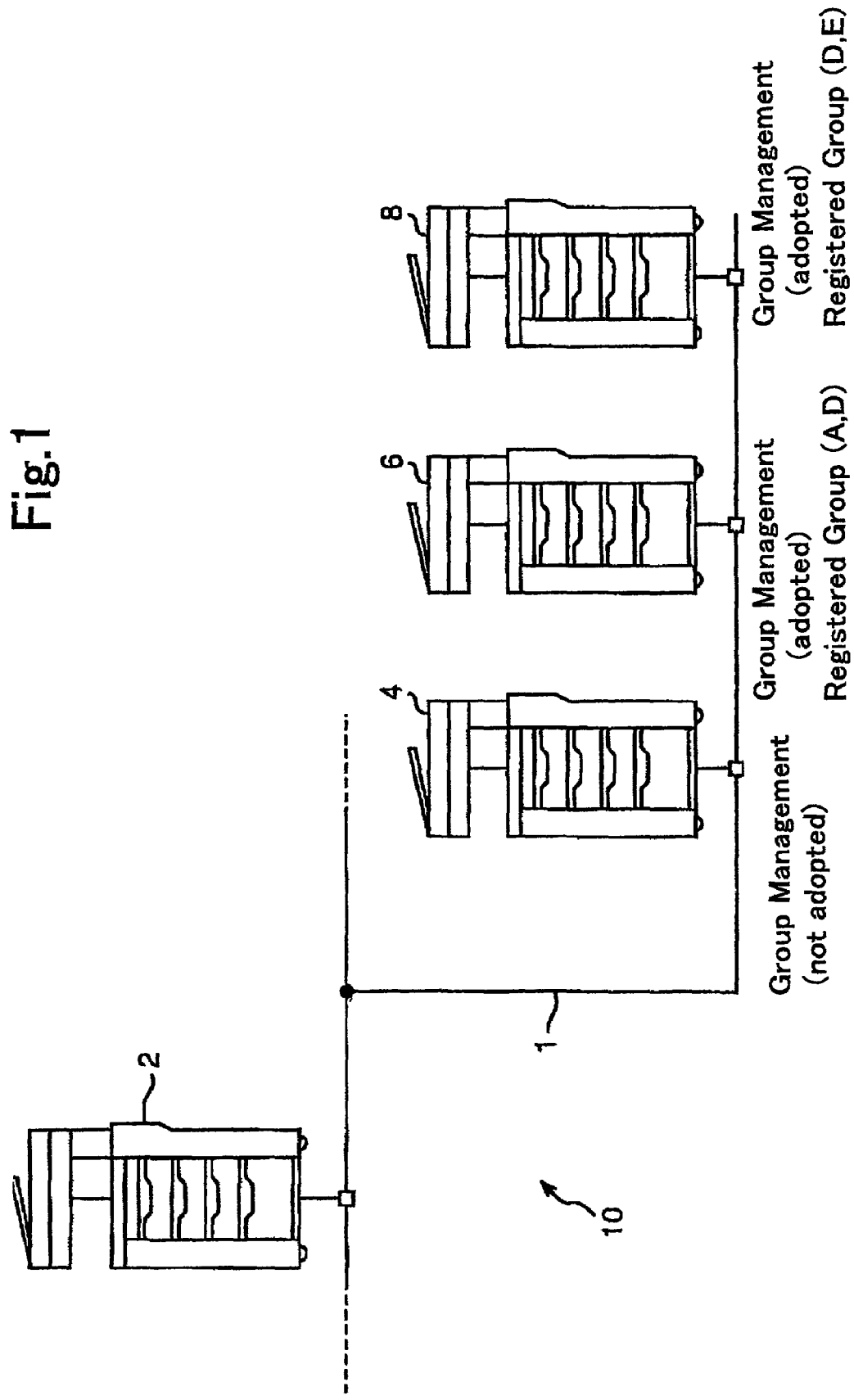
FIG. 1 is a drawing showing a printing system in which multiple image forming apparatuses are connected over a network.

FIG. 1 shows a printing system 10 comprising multiple image forming apparatuses 2, 4, 6 and 8 connected over a network 1. The multiple image forming apparatuses are printers, copying machines or the like, and carry out printing based on print data. Print data includes code data or image data sent from the printer server (not shown) over the network 1 or image data or the like that is obtained through reading of an original document by a copying machine or by other means. The network 1 comprises a communication circuit such as a LAN (Local Area Network) within a company, an intranet or the like.

The printing system 10 performs group management by which to keep track of the number of pages printed for each organization (or group). Group management is a system in which the group name is registered in each image forming apparatus, and the number of pages printed is counted for management purposes for that group and further for each user of the group, and printing is not permitted for users who belong to a group that is not registered. Examples of such groups would be the manufacturing department, sales department, etc., of a manufacturer or the like. As an example of group management, FIG. 1 shows Groups A, B and C registered with the image forming apparatus 2, Groups A and D registered with the image forming apparatus 6, and Groups D and E registered with the image forming apparatus 8. Group management is not adopted by the image forming apparatus 4, such that any user of any group can carry out printing using this apparatus and only the total number of pages printed is counted. One of the reasons that the number of pages printed is counted and kept track of is to charge the group in accordance with the number of pages printed. When this is applicable, a charging server (not shown) that receives information regarding the number of printed pages and assesses charges accordingly may be connected to the network 1.

The printing system 10 has a substitute printing function to have one of the other image forming apparatuses 4, 6 and 8 perform the remaining printing when a failure such as a paper out state occurs when the user is carrying out printing using the image forming apparatus 2. In addition, it also has a printing task distributing function to distribute the print data to not only the image forming apparatus 2 but also to one or more of the other image forming apparatuses 4, 6 and 8 not only in case of the occurrence of a failure but also in order to reduce the printing time, such that the print data may be printed out by the other printers. This specification describes a technology by which the number of pages printed for Group A may be determined, via the printing substitution function or the printing task distributing function, when a user belonging to Group A performs printing using not only the image forming apparatus 2 but also one or more other image forming apparatuses including the image forming apparatuses 4 and 8, regarding which no group management is in place regarding Group A.

The main characteristic of this embodiment is that when print data is printed out using a first image forming apparatus and a second image forming apparatus via the printing substitution function or the printing task distributing function, the number of pages printed by the second image forming apparatus is counted and kept track of by the first image forming apparatus. Consequently, regardless of whether group management is in place at the second image forming apparatus, the number of pages printed may be centrally maintained by the first image forming apparatus.

The construction of the image forming apparatuses 2, 4, 6 and 8 will first be explained below, followed by an explanation of the processing carried out by these image forming apparatuses in the printing system 10.

Figure 2:
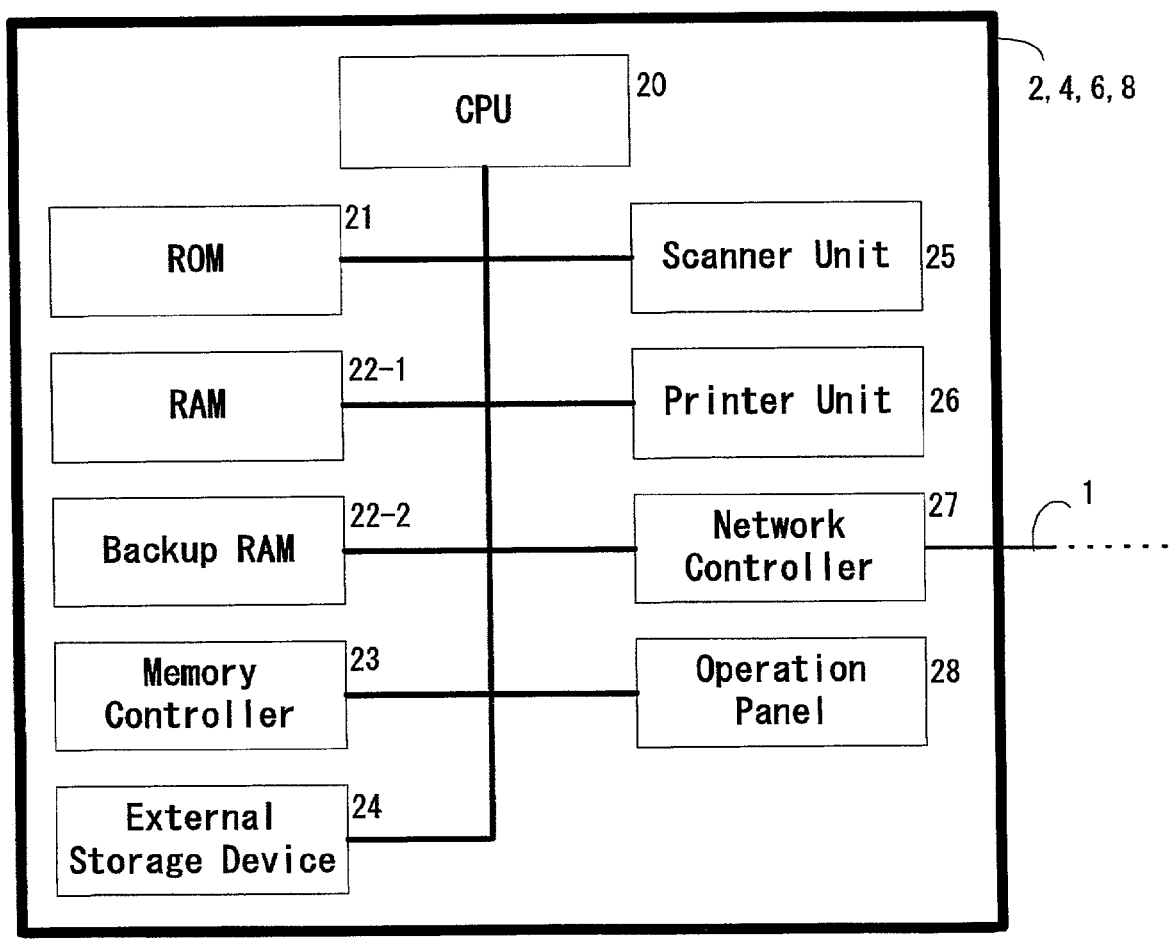
FIG. 2 is a block diagram showing the construction of an image forming apparatus.

FIG. 2 is a block diagram showing the construction of the image forming apparatus 2, 4, 6 or 8. The image forming apparatus 2 is used as the example below. As described above, the image forming apparatus 2 is such a device as a printer, copying machine or the like that outputs printed images. The image forming apparatus 2 includes a central processing unit (hereinafter 'CPU') 20, a read-only memory (hereinafter 'ROM') 21, a random access memory (hereinafter 'RAM') 22-1, a backup RAM 22-2, and a memory controller 23. The image forming apparatus 2 further includes an external storage device 24, a scanner portion 25, a printer portion 26, a network controller 27 and an operation panel 28.

Each component will be explained. First, the CPU 20 controls all of the operations performed by the image forming apparatus 2. For example, it performs processing to divide the print data in connection with the printing substitution function or the printing task distributing function. The CPU 20 also contains registers. The registers are used as counters that count the number of pages printed as described below. The ROM 21 is a non-volatile memory storage firmware that regulates the basic operations of the image forming apparatus 2 and the computer programs, etc., that regulate the operations to perform the processes shown in FIGS. 3 through 10. The RAM 22-1 is a memory that temporarily stores control data and print data. Counters may be included in the RAM 22-1 in place of the registers as well. The backup RAM 22-2 is a memory that stores various types of data that must be backed up, such as group administrator information and device settings. The memory controller 23 compresses and expands the image data read by the scanner portion 25, which is described below, or input from the network controller 27, which is also described below, over the network 1. Image data is later processed as print data. Print data is not limited to image data, however, and may comprise, for example, document data. In the case of document data, the memory controller 23 compresses and expands the document data.

The external storage device 24 is a so-called hard disk drive (HDD). The external storage device 24 stores image data that has been compressed or expanded, or print data that has undergone format conversion for transmission or after being received. Although the name of the device includes the adjective 'external', this does not necessarily mean that the component exists outside the image forming apparatus 2. In other words, the external storage device 24 may comprise a built-in HDD residing in the image forming apparatus 2. The scanner portion 25 reads an original document and generates image data. The read image data is compressed by the memory controller 23 and stored in the external storage device 24. The printer portion 26 is a public-domain printing mechanism that performs printing of image data. The network controller 27 sends and receives data to and from other apparatuses (such as the image forming apparatus 4 (FIG. 1) and the image database) over the network 1. Such data comprises print data, image data or the counter data described below. The operation panel 28 is a panel by which the user performs input of operation settings regarding the image forming apparatus 2. Where the operation panel 28 includes a display such as a liquid crystal display, it also performs control of the display.

The processing carried out by the image forming apparatus in the printing system 10 will now be explained. In the following explanation, a situation is considered in which printing is executed by the image forming apparatus 2 (FIG. 1), and after a failure occurs during printing, which disables continued printing, the rest of the printing is carried out by the image forming apparatus 4, 6 or 8. In the following explanation, the image forming apparatus 2 will be termed the distributing apparatus 2 and the image forming apparatuses 4, 6 and 8 will be termed the receiving apparatuses 4, 6 and 8.

The same discussion applies when print data is distributed beforehand to the image forming apparatus 2 and at least one of the image forming apparatuses 4, 6 and 8 for printing in order to reduce the overall processing time. In this case, the print data stored in the memory is divided into three sections, for example, such that first, second and third partial print data sets will be generated, and the distributing apparatus 2 executes printing for the first partial print data, while the second and third partial print data sets are sent to the receiving apparatuses 4 and 6 respectively for printing. The distributing apparatus 2 then receives the counter values representing the number of pages printed from the receiving apparatuses 4 and 6 based on the partial print data for each.

The processing performed by the distributing apparatus 2 will first be explained with reference to FIGS. 3 through 6, and the processing performed by the receiving apparatuses 4, 6 and 8 will be explained with reference to FIGS. 7 through 10. The printing operation explained below represents the control sequence executed mainly by the distributing apparatus and the CPU 20 (FIG. 2) thereof. It is assumed that the user has already sent the print data to be printed over the network 1 (FIG. 1), and that the print data is already stored in the RAM 22-1 (FIG. 1). It is also assumed that the user who performs the printing is a user who belongs to Group A, which is under group management at the distributing apparatus 2 (FIG. 1).

Figure 3:
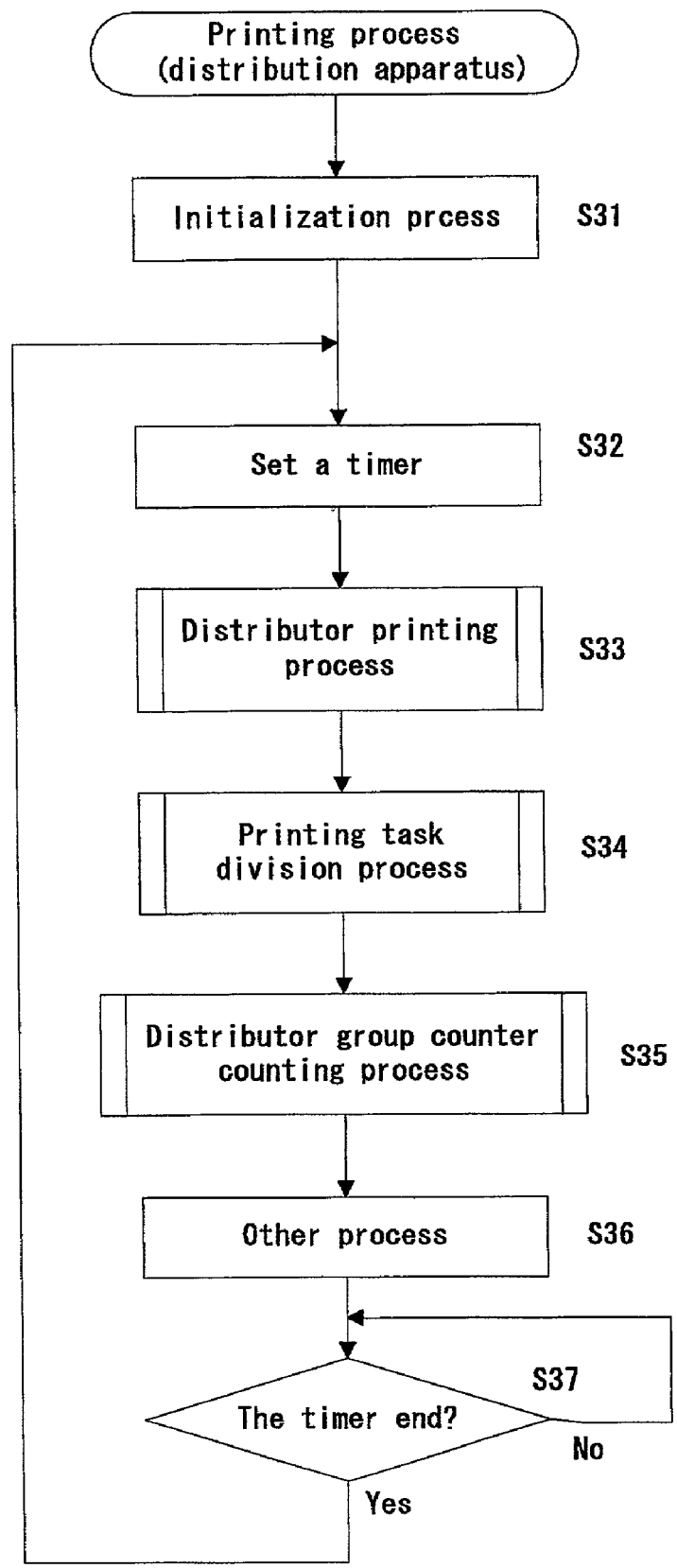
FIG. 3 is a flow chart showing the main routine of the printing operation performed by the distributing apparatus.

FIG. 3 is a flow chart showing the main routine of the printing operation performed by the distributing apparatus 2 (FIG. 1). First, the CPU 20 (FIG. 2) performs initialization (step S31). In the initialization process, user information setting and parameter setting for the distributing apparatus 2 itself, which are necessary for printing, are carried out. The CPU 20 then sets the timer (step S32). This timer regulates the length of one routine in the printing operation. By determining the completion of the clocking carried out by the timer in step S37, the period of time spent for one routine may be made constant.

A distributor printing process (step S33) and a printing task division process (step S34) are then performed by the CPU 20, followed by a counting process performed in conjunction with the group counter of the distributing apparatus ('distributor group counter counting process') (step S35). The distributor printing process (step S33) comprises a regular printing process. The details of the distributor printing process are described with reference to FIG. 4. The printing task division process (step S34) is a process in which the print data is distributed to one of the receiving apparatuses 4, 6 and 8 (FIG. 1) in case of a failure. The distributor group counter counting process (step S35) is a process in which the number of pages printed by the distributing apparatus 2 and by the receiving apparatuses 4, 6 and 8 is counted per group. The steps S33, S34 and S35 comprise subroutines.

When the printing process and the distributor group counter counting process (step S35) are completed, the CPU 20 performs other necessary processing (step S36), and determines whether or not the clocking by the timer has ended (step S37). Where the clocking by the timer has ended, the CPU 20 returns to step S32 and repeats the subsequent processes. Where the clocking by the timer has not ended, the CPU 20 waits until the clocking is completed.

Figure 4:
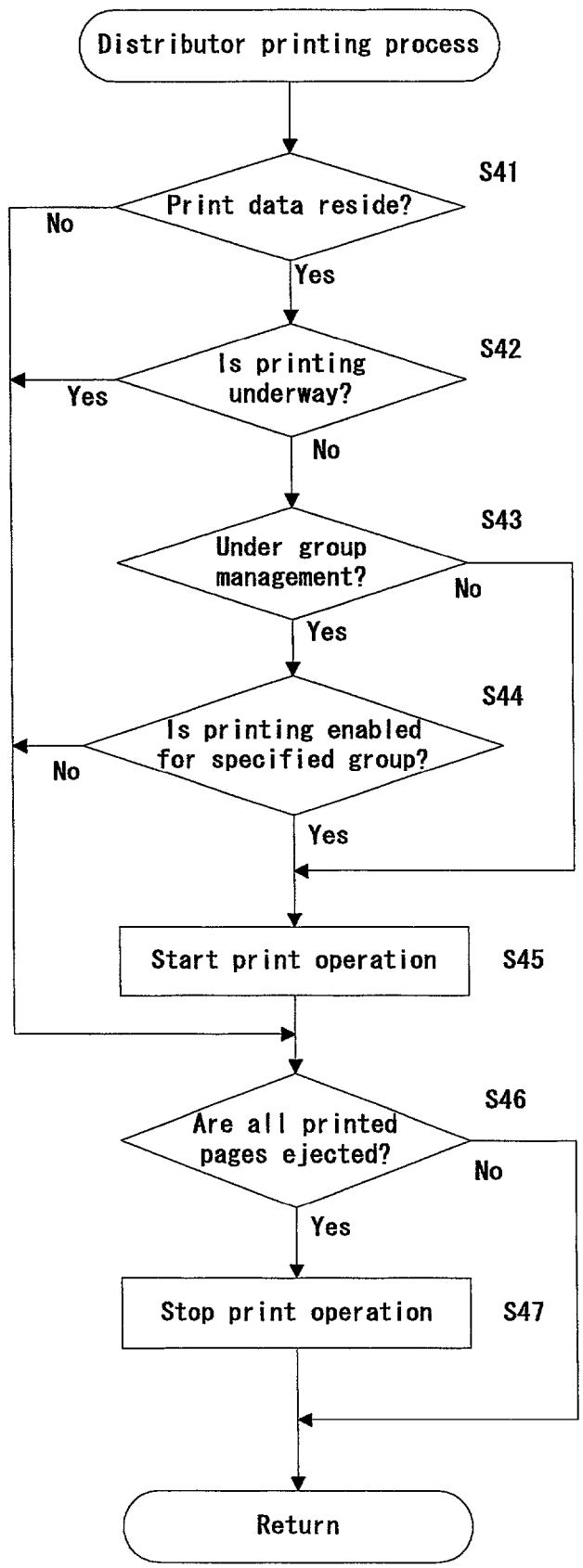
FIG. 4 is a flow chart showing the details of the printing operation performed by the distributing apparatus.

The distributor printing process (step S33) mentioned above will now be explained. FIG. 4 is a flow chart showing the details of the distributor printing process executed by the distributing apparatus. The CPU 20 first determines whether or not print data resides in the RAM 22-1 (FIG. 2) (step S41). Where print data resides in the RAM 22-1, the CPU 20 determines whether or not printing is underway (step S42). This is a process to check if printing has stopped. Where printing is not underway, the CPU 20 determines whether or not the distributing apparatus 2 is under group management (step S43). In the case of this example, the distributing apparatus 2 is under group management, as shown in FIG. 1 (group management exists).

The CPU 20 then determines whether or not printing is enabled for the specified group (step S44). This is a determination regarding whether or not the user belongs to a group managed through group management. The received print data usually includes a group number that identifies the group and a user name (or user number) that specifies the user. Based on these data items, the CPU 20 determines whether or not the printing is for a user who belongs to a group under group management. Whether it is determined that printing is enabled, the CPU 20 executes a printing operation (step S45). Subsequently, the CPU 20 determines whether or not ejection of all printed pages has been completed (step S46). This is determined based on whether or not more print data remains to be printed. When ejection of all printed pages has been completed, the printing operation is stopped (step S47).

Where there is no print data in step S41, printing is underway in step S42 or printing is not enabled for the specified group in step S44, the CPU 20 moves to step S46 without performing a printing operation.

Figure 5:
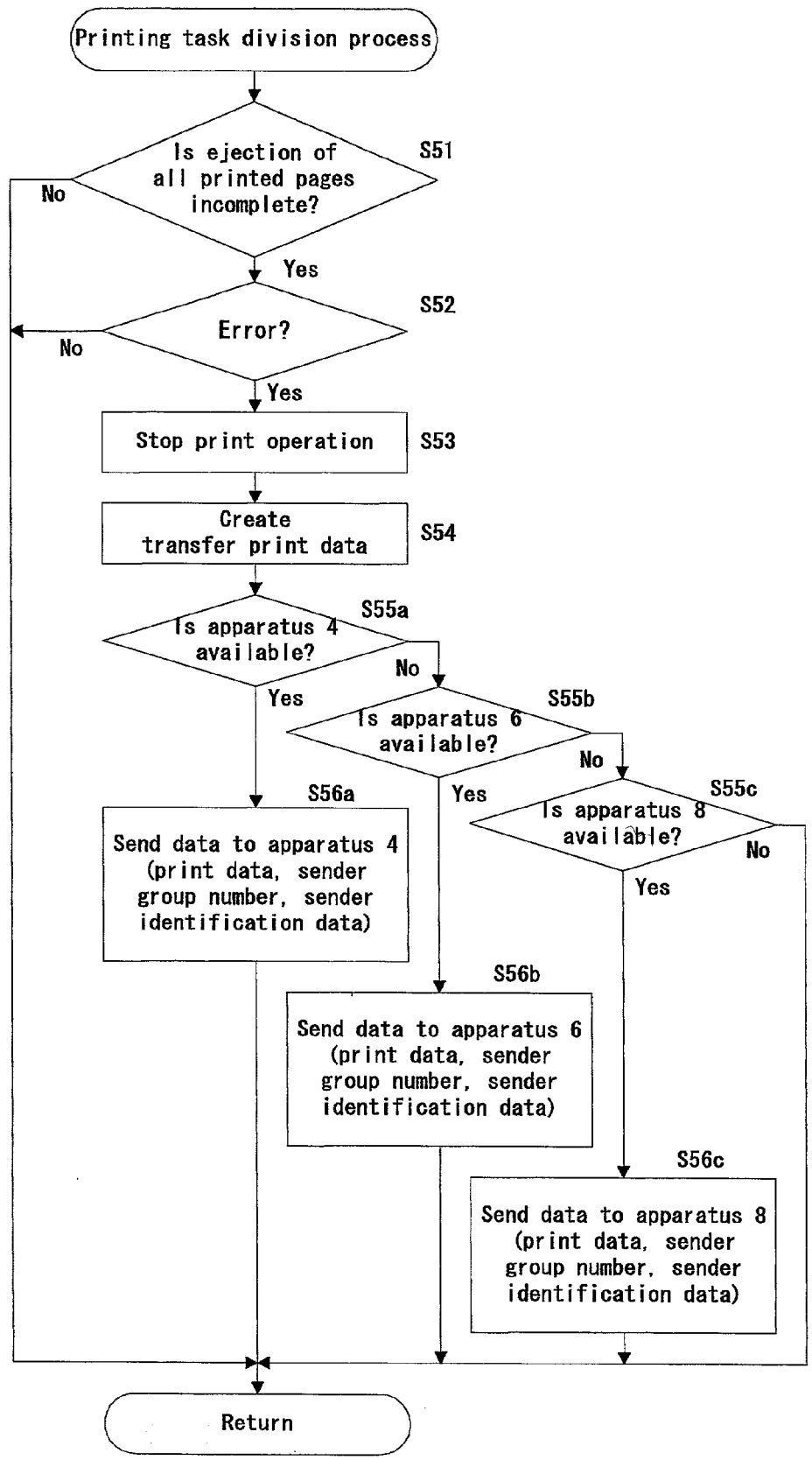
FIG. 5 is a flow chart showing the details of the divided printing task process.

FIG. 5 is a flow chart showing the details of the printing task division process (step S34 in FIG. 3) executed by the distributing apparatus 2. The CPU 20 determines whether or not ejection of all printed pages is still incomplete (step S51). Ejection is incomplete if print data still remains or if the printer portion 26 (FIG. 2) is still operating. Where ejection of all printed pages is incomplete, the CPU 20 determines whether or not an error occurred (step S52). As described above, an error represents the inability to continue printing. For example, an error comprises a paper out state, a paper jam, a toner consumed state, or the like.

In case of an error, the CPU 20 stops the printing operation (step S53) and creates transfer print data (step S54). Transfer print data is print data based on which the receiving apparatus 4, 6 or 8 is instructed to perform printing, and comprises the portion of the print data stored in the RAM 22-1 that has not been printed (FIG. 2). Print data further includes image forming apparatus control information that specifies the image forming conditions such as the number of pages to be printed, the paper size, and the selection of color mode or monochrome mode.

The CPU 20 then determines in sequential order whether or not the image forming apparatuses 4, 6 and 8 are available for printing (steps S55a, S55b and S55c). For this determination, the CPU 20 of the distributing apparatus 2 verifies with the receiving apparatuses 4, 6 and 8 whether they can perform a divided printing task. Upon receiving the verification inquiry, the receiving apparatuses 4, 6 and 8 return information indicating their availability for printing or lack thereof to the distributing apparatus 2. If an apparatus is available for printing as a result of the verification, the CPU 20 of the distributing apparatus 2 sends to that apparatus the transfer data for divided printing task (steps S56a, S56b and S56c). The transfer takes place when the network controller 27 sends the transfer data for divided printing task. Transfer data for divided printing task includes the transfer print data previously created, the transferring (sender) group number and the transferring (sender) apparatus identification data. The transferring group number is the number of the group (A in this example) to which the user belongs. The transferring apparatus identification data comprises the data by which to identify the distributing apparatus 2, such as the network address. The printing task division process is completed in this manner, and the CPU 20 returns to the main routine. Where ejection of all printed pages has been completed in step S51, no error has occurred in step S52, or the image forming apparatus 8 is not available for printing in step S55c (indicating that none of the image forming apparatuses 2, 4, 6 or 8 is available for printing), the printing task division process comes to an end and the CPU 20 returns to the main routine.

The distributing apparatus 2 (FIG. 1) can verify availability for printing after sending the transfer data for divided printing task to the receiving apparatuses 4, 6 and 8 (FIG. 1). By sending the data to be printed in advance, the process of sending the data for printing after the verification of availability for printing becomes unnecessary, such that printing may be carried out immediately following such verification. Furthermore, because the data to be printed is sent in advance, even where an error occurs in any of the receiving apparatuses when the data to be printed is sent thereto, the process to resend the data from the distributing apparatus 2 (FIG. 1) becomes unnecessary, such that printing may be carried out immediately following the verification. From the standpoint that printing can be immediately performed following the verification regarding availability for printing, such verification may be made after sending such information as the number of pages to be printed and the image forming conditions in advance instead of the data to be printed. In addition, as described below, the receiving apparatuses 4, 6 and 8 (FIG. 1) ordinarily determine whether they are available for printing based on their own individual status, but they may determine their availability based on the indicated image forming conditions and the like. When this approach is used, only the information needed for this determination should be sent. Consequently, availability for printing can be verified based on the transmission of minimal data, resulting in a reduction in network traffic.

Figure 6:
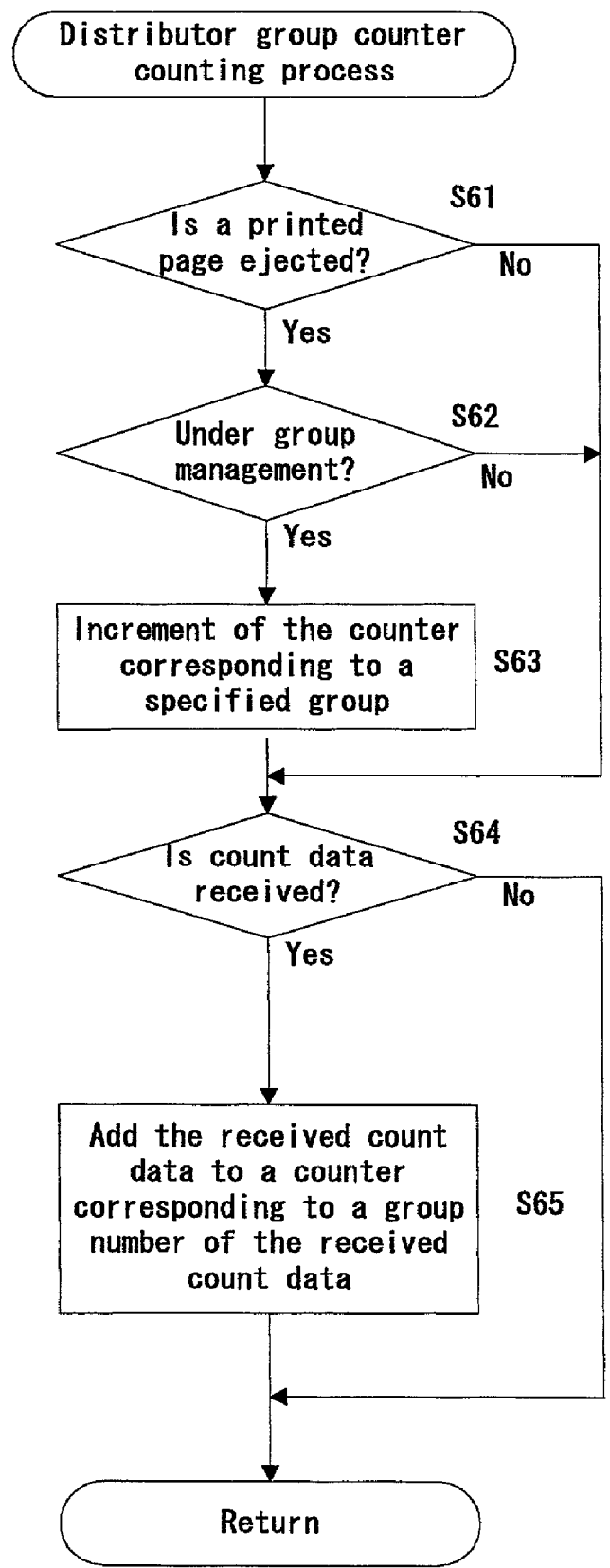
FIG. 6 is a flow chart showing the details of the counting process performed in conjunction with the group counter of the distributing apparatus.

FIG. 6 is a flow chart showing the details of the distributor group counter counting process (step S35 in FIG. 3). Because this process is carried out by the distributing apparatus 2 (FIG. 1), the number of pages printed by the distributing apparatus 2 is naturally counted and kept track of. Furthermore, it is characteristic of this process that even when the print data is divided in the printing task division process and printing is performed by an apparatus other than the apparatus 2 (i.e., by the receiving apparatus 4, 6 or 8, for example), the number of pages printed by such apparatus is also kept track of by the apparatus 2. That is, regardless of whether the other apparatus is under group management, the number of pages printed by the other apparatus is counted by the distributing apparatus 2. Consequently, the number of pages already printed by the distributing apparatus 2 (FIG. 1) and the number of pages printed by an apparatus other than the apparatus 2 may be added together to indicate the total number of pages output by the user of that group.

The CPU 20 first determines whether or not ejection of the printed pages has been completed (step S61). This determination may be made for each page or when all printing is finished. Where ejection of all pages printed has been completed, the CPU 20 determines whether or not group management is in effect (step S62).

Where group management is in effect, the number on the counter for the specified group number is incremented upward (step S63). When the process of step S63 is finished, or where ejection of printed pages is not completed in step S61 or group management is not in place, the CPU 20 determines whether or not counter data has been received (step S64).

Where counter data has been received from the other apparatus, the received data is added to the counter value on the counter for the group number included in the received data (step S65). This means that the received counter value is added to the counter value on the counter that was incremented in step S63. Therefore, even when an apparatus that is not covered by group management is used, such as the receiving apparatus 4, meaning that the number of pages printed by that apparatus cannot be monitored, the number of pages in the print data can be recorded by the distributing apparatus 2.

The distributor group counter counting process comes to an end in this manner, and the CPU 20 returns to the main routine. In addition, if counter data has not been received in step S64, the counting process comes to an end and the CPU 20 returns to the main routine. The processing that takes place in the distributing apparatus 2 that prints out the print data first has been explained above. A counter such as that described above can be included for each user, and in that case, the number of pages printed can be kept track of for each user of a group.

Figure 7:
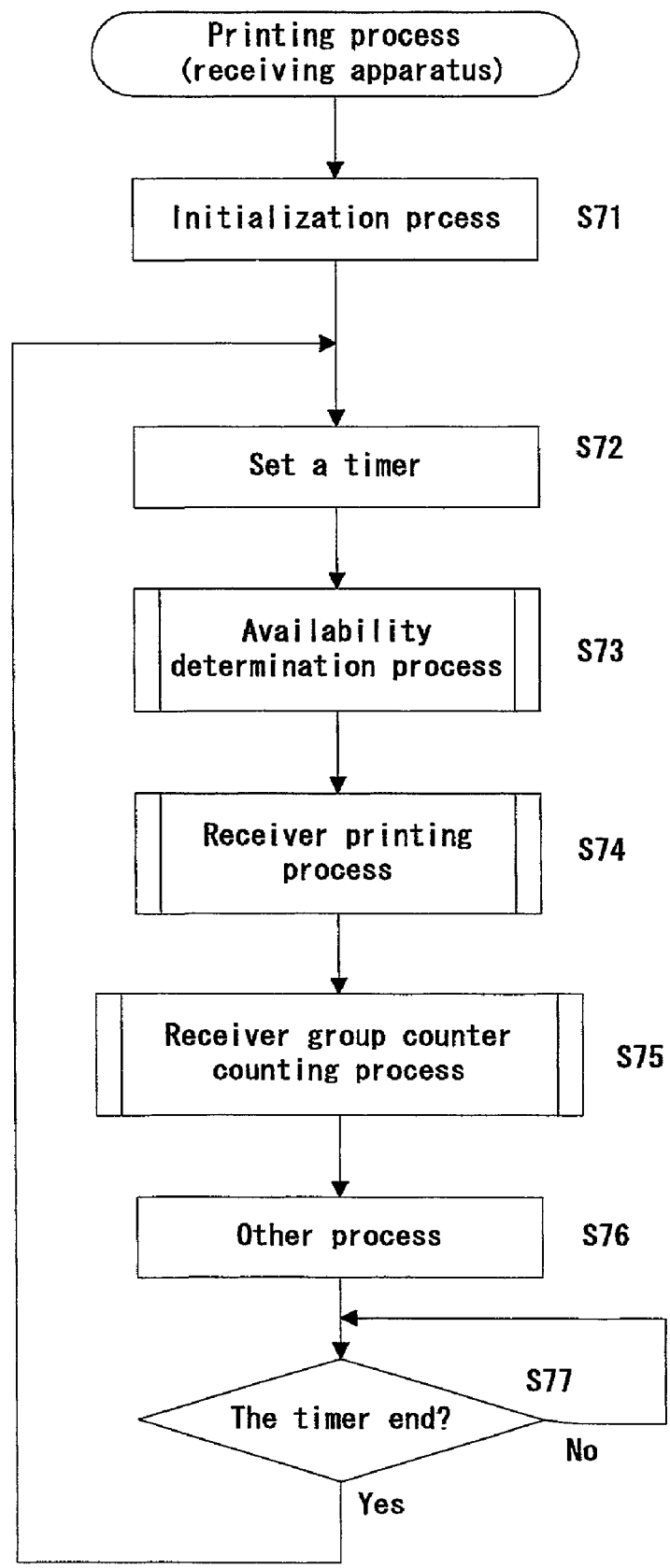
FIG. 7 is a flow chart showing the main routine of the printing operation performed by the receiving apparatus.

The processing that takes place in the receiving apparatus 4, 6 or 8 will now be explained. FIG. 7 is a flow chart showing the main routine of the printing operation carried out by the receiving apparatus. This printing operation represents the control sequence executed mainly by the CPU 20 of the receiving apparatus 4, 6 or 8. Therefore, unless otherwise specified, the 'CPU 20' refers to the CPU of the receiving apparatus 4, 6 or 8. The flow chart shown in FIG. 7 comprises steps S71 through S77. Of these steps, steps S71, S72, S76 and S77 are identical to steps S31, S32, S36 and S37, which were explained with reference to FIG. 3. Therefore, they will not be explained in detail below.

The CPU 20 of the receiving apparatus first performs initialization (step S71) and timer setting (step S72). The CPU 20 then performs an availability determination process (step S73) and a receiver printing process (step S74) as well as a counting process performed in conjunction with the group counter of the receiving apparatus ('receiver group counter counting process') (step S75).

In the availability determination process (step S73), each receiving apparatus 4, 6 and 8 determines whether or not it is available for printing. The result of this determination becomes the basis for the distributing apparatus to determine whether any of the receiving apparatuses 4, 6 are 8 is available for printing (steps S55a through 55c in FIG. 5). The details of this process are described below with reference to FIG. 8. The receiver printing process (step S74) is performed by the receiving apparatus 4, 6 or 8, and the details thereof are described below with reference to FIG. 9. In the receiver group counter counting process (step S75), the receiving apparatus 4, 6 or 8 counts the number of pages printed during its own printing operation. The details of this process are described below with reference to FIG. 10.

When the receiver group counter counting process (step S75) is completed, the CPU 20 performs other necessary processing (step S76), and determines whether or not the clocking by the timer has ended (step S77). Where the clocking by the timer has ended, the CPU 20 returns to step S72 and repeats the subsequent processes. Where the clocking by the timer has not ended, the CPU 20 waits until the clocking ends.

Figure 8:
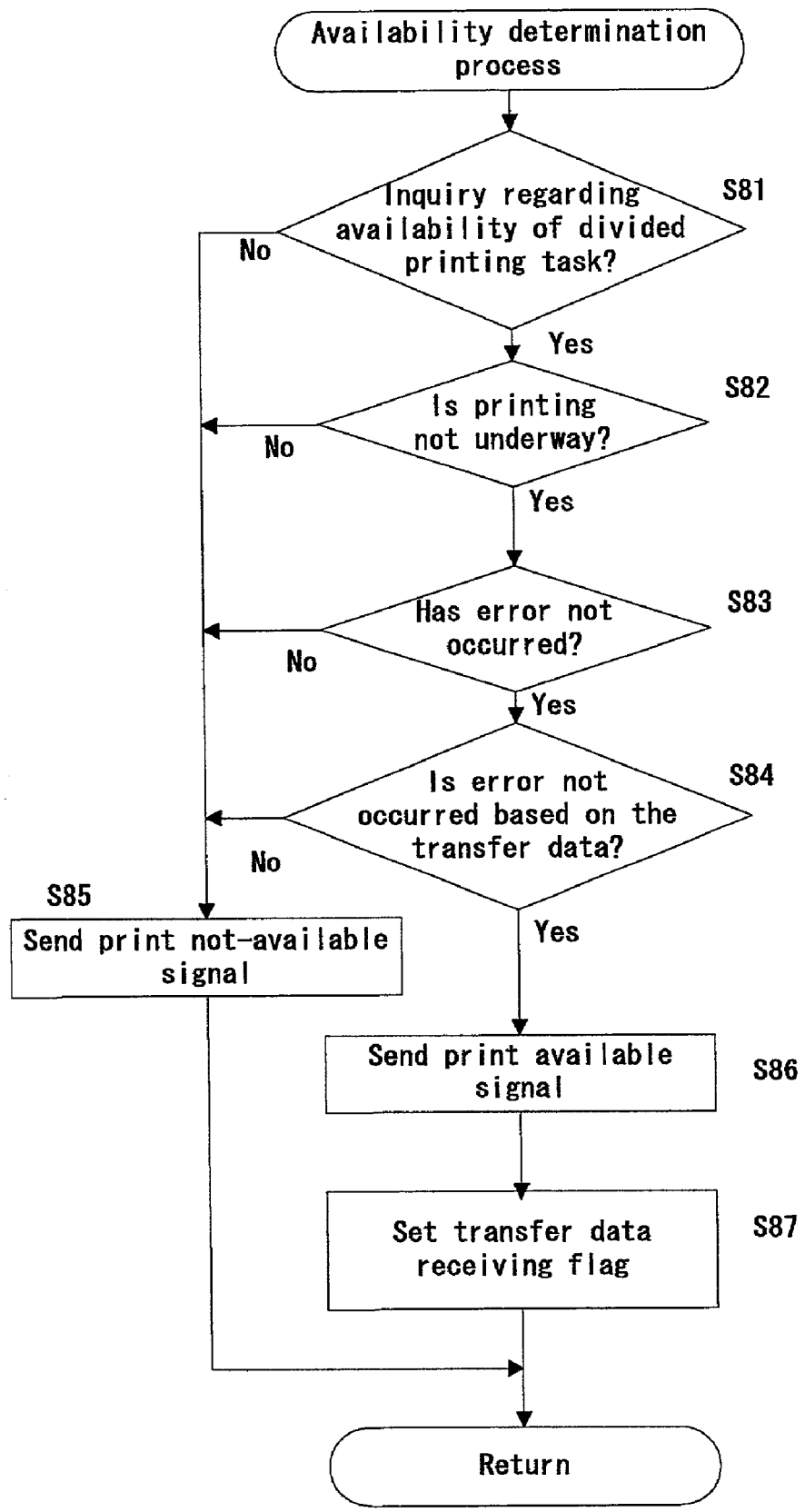
FIG. 8 is a flow chart showing the details of the process to verify availability for printing.

FIG. 8 is a flow chart showing the details of the availability determination process (step S73 in FIG. 7) executed by the receiving apparatus 4, 6 or 8. The CPU 20 determines whether or not an inquiry to verify availability to perform a divided printing task has been received (step S81). This inquiry is output by the CPU 20 of the distributing apparatus 2 in the step S55a, 55b or 55c in FIG. 5. Where such an inquiry has been received, the CPU 20 of the receiving apparatus 4, 6 or 8 determines whether or not printing is underway (step S82), because the divided printing task to be performed by the receiving apparatus 4, 6 or 8 cannot be performed is printing is underway. Where printing is not underway, it is further determined whether or not an error has occurred (step S83), because if an error has occurred, printing cannot be carried out. Where no error has occurred, it is determined whether or not a print error will occur based on the transfer data for divided printing task (step S84). This is a determination in order to avoid such an error as the absence of designated paper.

Where all of the determinations in steps S81 through S84 are negative ('NO' in the drawing), the CPU 20 returns to the distributing apparatus 2 a response indicating that printing cannot be carried out (step S85).

On the other hand, where the transfer data for divided printing task indicates that no print errors will occur, the CPU 20 returns to the distributing apparatus 2 a response indicating that printing can be performed (step S86), and sets a flag indicating that transfer data for divided printing task is being received (step S87). This is carried out for the reason that, because performance of a divided printing task is requested when an inquiry regarding availability for performance of a divided printing task is received, if a response that indicates availability for printing is returned, transfer data for divided printing task is immediately sent from the distributing apparatus 2. The CPU 20 makes determination regarding availability for printing regardless of whether the receiving apparatus 4, 6 or 8 is under group management, because group management is carried out by the distributing apparatus 2.

In the above steps S82 and S83, availability for printing is determined based on the status of the receiving apparatus at the time the inquiry is received, i.e., based on whether printing is underway, an error has occurred, etc., but this determination may be made based on the image forming conditions requested via the transfer print data. For example, where there is little color toner remaining in the receiving apparatus, or color printing cannot be performed because the receiving apparatus does not have a color printing capability even though color printing is designated via the image forming conditions indicated by the transfer print data, the response may indicate unavailability for printing.

Figure 9:
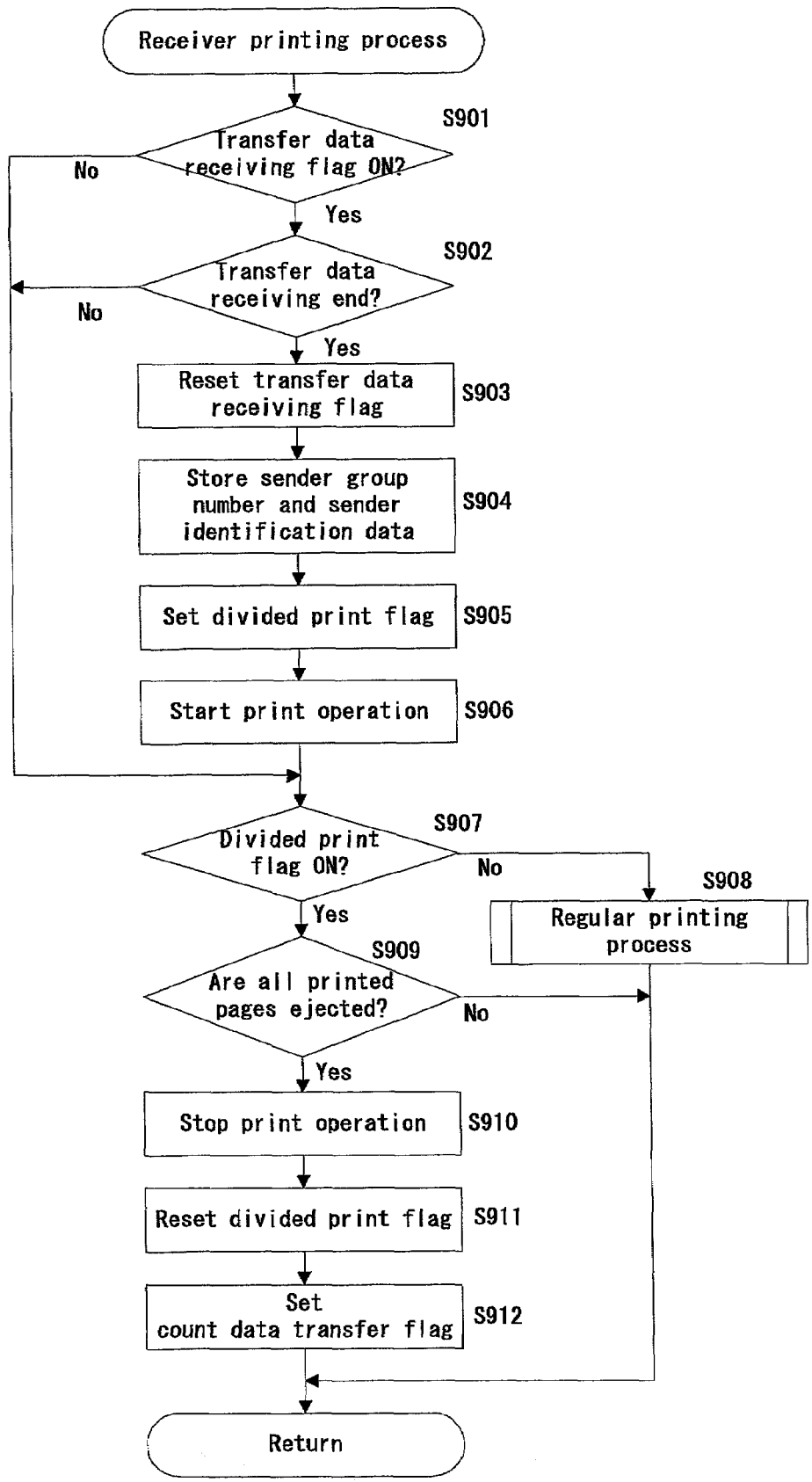
FIG. 9 is a flow chart showing the details of the printing operation performed by the receiving apparatus.

FIG. 9 is a flow chart showing the details of the receiver printing process executed by the receiving apparatus (step S74 in FIG. 7). The receiver printing process is a process to perform printing based on the transfer data for divided printing task that was received from the distributing apparatus 2. The CPU 20 first determines whether or not the flag indicating that transfer data is being received is ON (step S901). Where this flag is ON, that means that transfer data for divided printing task is being received. Therefore, in that case, the CPU 20 determines whether or not the reception of transfer data for divided printing task is completed (step S902). Where this reception is completed, the flag is reset (step S903). When this is done, the CPU 20 has stored the received transfer data for divided printing task in the RAM 22-1 (FIG. 2). The CPU 20 extracts the transferring (sender) group number and the transferring (sender) apparatus identification data from the received data, and stores them in a separate area in the RAM 22-1 (FIG. 2) or the backup RAM 222 (FIG. 2) so that they can be easily read out (step S904). As described above, The transferring (sender) group number is the number of the group (A in this example) to which the user belongs, and the transferring (sender) apparatus identification data comprises the data by which to identify the distributing apparatus 2, such as the network address.

The CPU 20 then sets a flag that indicates that printing based on the transfer data for divided printing task is underway (step S905), and executes a printing operation (step S906). It then determines whether or not performance of a divided printing task is being carried out (step S907). This determination regarding performance of a divided printing task is made even when a negative determination is made in steps S901 and S902 ('NO' in the drawing). This determination is made based on the flag that indicates that a divided printing task is being executed. If such printing is being carried out, it is then determined whether or not ejection of printed pages for all transfer print data has been completed (step S909). Where such printing is not being carried out, a regular printing operation is performed (step S908). A regular printing operation refers to a printing operation other than a printing operation for a divided printing task, and comprises a printing process that is performed when print data is sent from a user who wants to carry out printing using the receiving apparatus 4, 6 or 8 from the start. Because a regular printing operation is identical to the printing process carried out by the distributing apparatus and explained with reference to FIG. 4, it will not be explained in detail here.

Where ejection of printed pages for all transfer print data is finished in step S909 (YES in step S909), the CPU 20 stops the printing operation (step S910), resets the flag that indicates that a divided printing task is being executed, as such printing has now been completed (step S911), and sets the flag that indicates transmission of the counter data (step S912). This is a flag that is used to indicate whether or not the number of pages printed (counter data) by the receiving apparatus 4, 6 or 8 (FIG. 1) based on the print data distributed from the distributing apparatus 2 is being transmitted to the distributing apparatus 2 (FIG. 1). With the completion of the above processing, the receiver printing process comes to an end, and the CPU 20 returns to the main routine. In addition, when a regular printing operation is finished in step S908 or ejection of all printed pages is not finished in step S909, the receiver printing process comes to an end, and the CPU 20 returns to the main routine.

FIG. 10 is a flow chart showing the details of the receiver group counter counting process (step S75 in FIG. 7). As described above, the receiving apparatuses 4, 6 and 8 include counters comprising registers residing in the CPU 20 or the RAM 22-1 (FIG. 2). Although the receiving apparatuses 4, 6 and 8 do not carry out group management regarding Group A, the number of pages currently being printed can be counted using one of these counters. The counters included in the receiving apparatuses 4, 6 and 8 will be referred to as 'temporary group counters'. There are also apparatuses regarding which management regarding Group A is in effect, as the receiving apparatus 6 (FIG. 2). Such an apparatus has group counters, which are different from the temporary group counters referred to herein.

The CPU 20 first determines whether or not ejection of printed pages has been finished (step S111). Where it is finished, the CPU 20 determines whether or not printing of a divided printing task is being performed (step S112), because if such printing is underway, it is necessary to increment upward one of the temporary group counters in order to return a counter value to the distributing apparatus 2 (FIG. 1). If such printing is underway, the temporary group counter is incremented upward (step S113). If not, the CPU 20 determines whether or not group management is in effect (step S114). If group management is in effect, the group counter that corresponds to the specified group number is incremented upward (step S115), as the operation is deemed a regular operation. Following step S113, it is determined whether or not the flag that indicates the transmission of counter data is ON (step S116). This flag is turned ON when the printing of a divided printing task is finished and the number of printed pages is established (S912 in FIG. 9). In other words, it becomes ON when the value on the temporary group counter is established. Therefore, where this flag is ON, the value on the temporary group counter and the transferring group number are sent to the distributing apparatus 2 (FIG. 1) (step S117). Consequently, regardless whether or not group management is in place, the number of printed pages can be kept track of by the distributing apparatus 2 (FIG. 1). The transferring apparatus identification data, which is held by the receiving apparatus, is used to specify the distributing apparatus.

When the transmission of the value on the group counter or the temporary group counter is finished, the CPU 20 resets the temporary group counter (step S118). With the completion of the above processing, the receiver group counter counting process comes to an end, and the CPU 20 returns to the main routine. In addition, the CPU 20 also returns to the main routine when the flag that indicates the ongoing transmission of counter data in step S116 is not ON.

In this embodiment, the computer program based on which the CPU 20 performs the processes shown in FIGS. 3 through 10 is stored in the ROM 21 (FIG. 2), but it may be stored on the external storage device 24 such as a hard disk. The CPUs 20 of the distributing apparatus 2 and the receiving apparatuses 4, 6 and 8 execute the computer program, so that the component elements of each apparatus are controlled such that they realize the functions explained in connection therewith. Such a computer program may be provided recorded in a recording medium such as an optical disk such as a CD or DVD, a magnetic disk such as a floppy disk, or a semiconductor memory such as a smart medium or compact flash memory.

According to this embodiment, even when a first image forming apparatus has a second image forming apparatus print out part of the print data, the first image forming apparatus receives the value that indicates the number of pages printed by the second image forming apparatus, and therefore it is not necessary for the second image forming apparatus to have means to keep track of the number of printed pages. More specifically, the first image forming apparatus includes a counter that keeps track of the number of pages it prints based on print data, and by adding the number of pages printed by the second image forming apparatus to the value on the above counter, the number of printed pages may be kept track of for each group regardless of the image forming apparatus used.

If counters are included for each user for whom printing is permitted, the number of printed pages may be kept track of not only for each group but also for each user in each group.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A printing system comprising a first image forming apparatus and a second image forming apparatus connected to a network,
wherein the first image forming apparatus includes:
a memory that stores print data;
a first counter that counts the number of pages printed by the first image forming apparatus based on the print data for each user group;
a processor that generates as partial print data part of the print data stored in the memory;
a first transmission controller that sends the partial print data generated by the processor to the second image forming apparatus; and
a reception controller that receives the counter value representing the number of pages printed by the second image forming apparatus based on the partial print data,
wherein the second image forming apparatus includes:
a second counter that counts the number of pages printed based on the partial print data from the first image forming apparatus; and
a second transmission controller that sends the counter value representing the number of printed pages counted by the second counter to the first image forming apparatus.

2. A printing system as claimed in claim 1,
wherein said first counter updates the counter value representing the number of printed pages by adding the counter value received by the reception controller to the current counter value.

3. A printing system as claimed in claim 1,
wherein said first counter includes a counter corresponding to a registered group,
the first transmission controller sends information regarding the registered group together with the partial print data, and
the second transmission controller sends the group information together with the counter value.

4. A printing system as claimed in claim 3,
wherein said first image forming apparatus permits printing only for users that belong to the registered group.

5. A printing system as claimed in claim 1,
wherein said processor generates partial print data when a failure occurs while the first image forming apparatus is performing printing based on the print data.

6. A printing system as claimed in claim 1, further comprising:
a third image forming apparatus which is connected to the network,
wherein said processor generates multiple sets of partial print data by dividing the print data stored in the memory into multiple sets, and the first transmission controller sends each set of partial print data to the second and third image forming apparatuses.

7. An image forming apparatus connected to other image forming apparatuses over a network, the image forming apparatus comprising:
a memory that stores print data;
a printing unit that performs printing based on the print data;
a counter that counts the number of pages printed by the printing unit based on the print data for each user group;
a processor that generates as partial print data part of the print data stored in the memory;
a transmission controller that sends the partial print data generated by the processor to one or more of the other image forming apparatuses; and
a reception controller that receives the counter value or values representing the number of pages printed by one or more of the other image forming apparatuses based on the partial print data.

8. A printing system as claimed in claim 7,
wherein said counter updates the counter value representing the number of pages printed by adding the counter value or values received by the reception controller to the current counter value.

9. A printing system as claimed in claim 7,
wherein said counter includes a counter corresponding to a registered group,
the transmission controller sends information regarding the registered group together with the partial print data, and
the reception controller receives the group information together with the counter value.

10. A printing system as claimed in claim 7,
wherein said processor generates partial print data when a failure occurs while the printing unit is performing printing based on the print data.

11. A print management method that records the number of pages printed using an image forming apparatus connected with other image forming apparatus over a network, the method comprising the steps of:
storing print data in a memory;
performing printing based on the print data;
counting the number of pages printed based on the print data for each group;
generating as partial print data part of the print data stored in the memory;
sending the generated partial print data to the other image forming apparatus or apparatuses; and
receiving the counter value representing the number of pages printed by each other image forming apparatus based on the partial print data.

12. A computer-readable recording medium in which the print management method as claimed in claim 11 is recorded.

* * * * *